(12) United States Patent
Shin et al.

(10) Patent No.: US 9,214,116 B2
(45) Date of Patent: Dec. 15, 2015

(54) DISPLAY PANEL HAVING A TRANSPARENT SUBPIXEL CONNECTED TO A FIRST GATE LINE WITH A FIRST TRANSISTOR AND A SECOND GATE LINE ADJACENT TO THE FIRST GATE LINE WITH A SECOND TRANSISTOR AND A DISPLAY APPARATUS HAVING THE SAME

(71) Applicant: SAMSUNG DISPLAY CO., LTD., Gyeonggi-Do (KR)

(72) Inventors: Yong-Hwan Shin, Yongin-si (KR); Jin-Seob Byun, Seoul (KR); Baek-Kyun Jeon, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 271 days.

(21) Appl. No.: 13/747,783

(22) Filed: Jan. 23, 2013

(65) Prior Publication Data
US 2014/0098144 A1    Apr. 10, 2014

(30) Foreign Application Priority Data
Oct. 5, 2012   (KR) .................. 10-2012-0110903

(51) Int. Cl.
| | |
|---|---|
| G09G 3/36 | (2006.01) |
| G09G 3/34 | (2006.01) |
| G02F 1/13 | (2006.01) |
| G09G 3/20 | (2006.01) |
| G02F 1/133 | (2006.01) |
| G02F 1/1362 | (2006.01) |

(52) U.S. Cl.
CPC .......... *G09G 3/3607* (2013.01); *G02F 1/13306* (2013.01); *G02F 1/13624* (2013.01); *G02F 1/136286* (2013.01); *G09G 3/2003* (2013.01); *G09G 3/342* (2013.01); *G09G 3/3413* (2013.01); *G09G 3/3614* (2013.01); *G02F 2201/52* (2013.01); *G09G 2300/0452* (2013.01); *G09G 2310/0237* (2013.01)

(58) Field of Classification Search
CPC .................. G09G 3/20; G09G 3/2003; G09G 3/34–3/3426; G09G 3/36; G09G 3/3607; G09G 2310/0237; G02F 1/13306; G02F 1/136286; G02F 1/13624; G02F 2201/52
USPC ............. 345/690–697, 84, 87, 88, 90, 92, 94, 345/98–100, 102; 349/42
See application file for complete search history.

(56) References Cited

U.S. PATENT DOCUMENTS

| | | | |
|---|---|---|---|
| 5,528,395 A * | 6/1996 | So .................................... | 349/42 |
| 7,629,988 B2 | 12/2009 | Chung et al. | |
| 7,656,476 B2 | 2/2010 | So | |
| 2002/0044119 A1 * | 4/2002 | Kwon ............................. | 345/87 |
| 2004/0257323 A1 * | 12/2004 | Heo ................................ | 345/88 |
| 2006/0109227 A1 * | 5/2006 | Park ............................... | 345/98 |
| 2007/0268429 A1 * | 11/2007 | So ................................. | 349/106 |
| 2007/0296666 A1 * | 12/2007 | Son ................................ | 345/88 |
| 2010/0073406 A1 * | 3/2010 | Shishido et al. .............. | 345/691 |

FOREIGN PATENT DOCUMENTS

KR    1020080002301    1/2008

* cited by examiner

*Primary Examiner* — Nathan Danielsen
(74) *Attorney, Agent, or Firm* — F. Chau & Associates, LLC

(57) ABSTRACT

A display panel includes a first color subpixel, a second color subpixel and a transparent subpixel. The first color subpixel is connected to a first gate line. The second color subpixel is connected to the first gate line. The transparent subpixel is connected to the first gate line and a second gate line adjacent to the first gate line.

19 Claims, 11 Drawing Sheets

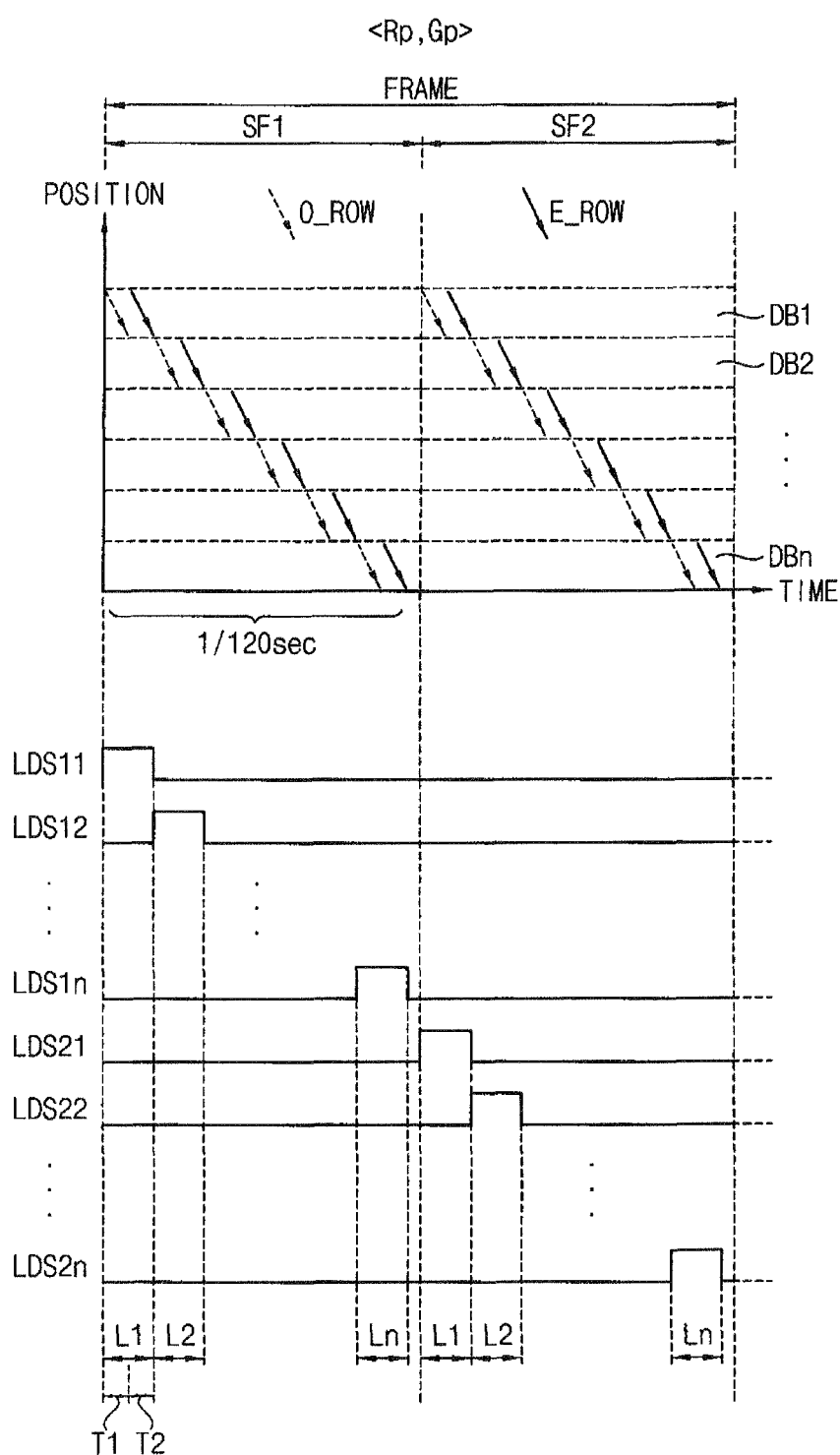

DISPLAY PANEL HAVING A TRANSPARENT SUBPIXEL CONNECTED TO A FIRST GATE LINE WITH A FIRST TRANSISTOR AND A SECOND GATE LINE ADJACENT TO THE FIRST GATE LINE WITH A SECOND TRANSISTOR AND A DISPLAY APPARATUS HAVING THE SAME

CROSS-REFERENCE TO RELATED APPLICATION

This application claims priority under 35 U.S.C. §119 to Korean Patent Application No. 10-2012-0110903, filed on Oct. 5, 2012, the disclosure of which is incorporated by reference herein in its entirety.

TECHNICAL FIELD

The present invention relates to a display panel and a display apparatus including the display panel.

DISCUSSION OF THE RELATED ART

Generally, a liquid crystal display apparatus includes a liquid crystal display panel for displaying an image by using light transmittance of liquid crystal and a light source module for providing light to the liquid crystal display panel. For example, the light source module may be a backlight assembly.

The liquid crystal display panel generally includes a first substrate having pixel electrodes and thin film transistors connected to the pixel electrodes, a second substrate having a common electrode and color filters, and a liquid crystal layer disposed between the first and second substrates.

The light source module generally includes a plurality of light sources for generating light used to display an image on the liquid crystal display panel. For example, the light sources may include a cold cathode fluorescent lamp ("CCFL"), an external electrode fluorescent lamp ("EEFL"), a flat fluorescent lamp ("FFL"), or a light emitting diode ("LED").

Generally, the light source generates a white light. A color filter allows a narrow range of wavelengths among the white light (essentially a single color) to pass. However, when the white light passes through the color filter, energy of the white light is lost. Due to the energy loss at the color filter, a power consumption of the display apparatus increases.

SUMMARY

Exemplary embodiments of the present invention provide a display panel that can quicken a response time in a display apparatus.

Exemplary embodiments of the present invention provide a display apparatus having the display panel.

According to an exemplary embodiment of the present invention, a display panel includes a first color subpixel, a second color subpixel and a transparent subpixel. The first color subpixel is connected to a first gate line. The second color subpixel is connected to the first gate line. The transparent subpixel is connected to the first gate line and a second gate line adjacent to the first gate line.

In an exemplary embodiment of the present invention, the first color subpixel may include a first transistor connected to the first gate line and a first data line, and a first pixel electrode connected to the first transistor, the second color subpixel may include a second transistor connected to the first gate line and a second data line, and a second pixel electrode connected to the second transistor, and the transparent subpixel may include a third transistor connected to the first gate line and a third data line, a fourth transistor connected to the second gate line and a fourth data line, and a third pixel electrode connected to the third and fourth transistors.

In an exemplary embodiment of the present invention, the first color subpixel may be red and the second color subpixel may be green.

In an exemplary embodiment of the present invention, the first color subpixel may be red and the second color subpixel may be blue.

In an exemplary embodiment of the present invention, the first color subpixel may be green and the second color subpixel may be blue.

According to an exemplary embodiment of the present invention, a display apparatus includes a display panel, a light-source part and a panel driving part. The display panel includes a first color subpixel having a first primary color, a second color subpixel having a second primary color and a transparent subpixel, the first and second color subpixels connected to a first gate line or a second gate line, the transparent subpixel connected to the first gate line and the second gate line. The light-source part may alternately provide the display panel with a first color light having a third primary color and a second color light having a mixed color by mixing the first primary color and the second primary color during a frame which includes a first sub frame and a second sub frame. The panel driving part may alternately drive the first gate line and the second gate line.

In an exemplary embodiment of the present invention, the first color subpixel may include a first transistor connected to the first gate line and a first data line and a first pixel electrode connected to the first transistor, the second color subpixel may include a second transistor connected to the first gate line and a second data line, and a second pixel electrode connected to the second transistor, and the transparent subpixel may include a third transistor connected to the first gate line and a third data line, a fourth transistor connected to the second gate line and a fourth data line, and a third pixel electrode connected to the third and fourth transistors.

In an exemplary embodiment of the present invention, the first primary color may be red and the second primary color may be green.

In an exemplary embodiment of the present invention, the first primary color may be red and the second primary color may be blue.

In an exemplary embodiment of the present invention, the first primary color may be green and the second primary color may be blue.

In an exemplary embodiment of the present invention, the display apparatus may further include a control part to set a first grayscale data level (A) of the first primary color, a second grayscale data level (B) of the second primary color and a third grayscale data level (C) of the third primary color based on the color light provided to the display panel.

In an exemplary embodiment of the present invention, during the first sub frame in which the first color light is provided to the display panel, the control part may set a grayscale data level of the transparent subpixel to the third grayscale data level (C), and during the second sub frame in which the second color light is provided to the display panel, the control part may set a grayscale data level of the first color subpixel to A-min (A,B), a grayscale data level of the second color subpixel to B-min (A,B), and the grayscale data level of the transparent subpixel to min (A,B).

In an exemplary embodiment of the present invention, during the first sub frame in which the first color light is provided to the display panel, the control part may set a grayscale data level of the transparent subpixel to 2C, and during the second sub frame in which the second color light is provided to the display panel, the control part may set a grayscale data level of the first color subpixel to A, a grayscale data level of the second color subpixel to B, and the grayscale data level of the transparent subpixel to A+B.

In an exemplary embodiment of the present invention, the panel driving part may drive the first gate line during a first period of each of the first and second sub frames and drive the second gate line during a second period of each of the first and second sub frames, and a data signal applied to the transparent subpixel during the first period may be the same as a data signal applied to the transparent subpixel during the second period.

In an exemplary embodiment of the present invention, the panel driving part may drive the first gate line during a first period of each of the first and second sub frames and drive the second gate line during a second period of each of the first and second sub frames, and a data signal applied to the transparent subpixel during the first period may be different from a data signal applied to the transparent subpixel during the second period.

In an exemplary embodiment of the present invention, during the first and second periods, a black data signal may be applied to the transparent subpixel to display a black image.

In an exemplary embodiment of the present invention, the light-source part may include a plurality of light-emitting blocks arranged along an image scan direction of the display panel, the light-emitting blocks may sequentially emit light in the image scan direction during each of the first and second sub frames.

In an exemplary embodiment of the present invention, the panel driving part may individually drive a plurality of display blocks corresponding to the light-emitting blocks, and the panel driving part may drive odd-numbered gate lines of the display panel during a first period of a light-emitting period in which each of the light-emitting blocks emits light, and drive even-numbered gate lines of the display panel during a second period of the light-emitting period.

In an exemplary embodiment of the present invention, the light-emitting blocks may be sequentially driven during a first period of each of the first and second sub frames, and sequentially driven during a second period of each of the first and second sub frames.

In an exemplary embodiment of the present invention, the panel driving part may drive odd-numbered gate lines of the display panel during the first period and drive even-numbered gate lines of the display panel during the second period.

According to an exemplary embodiment of the present invention, a display apparatus includes a display panel including a first color subpixel, a second color subpixel and a transparent subpixel arranged in a row; a light source configured to provide light to the display panel; and a control part configured to, in a first sub frame of a frame, cause the transparent subpixel to receive a first data signal during a first period of the first sub frame to display a blue image corresponding to blue light and the first data signal during a second period of the first sub frame to display the blue image and, in a second sub frame of the frame, the control part is configured to cause the transparent subpixel to receive a second data signal during a first period of the second sub frame to display a white image corresponding to yellow light and the second data signal during a second period of the second sub frame to display the white image.

BRIEF DESCRIPTION OF THE DRAWINGS

The above and other features of the present invention will become more apparent by describing in detail exemplary embodiments thereof with reference to the accompanying drawings, in which:

FIGS. 7A and 7B are diagrams illustrating a method of driving the display apparatus shown in FIG. 6, according to an exemplary embodiment of the present invention.

DETAILED DESCRIPTION OF THE EMBODIMENTS

Hereinafter, exemplary embodiments of the present invention will be explained in detail with reference to the accompanying drawings.

Figure 1:
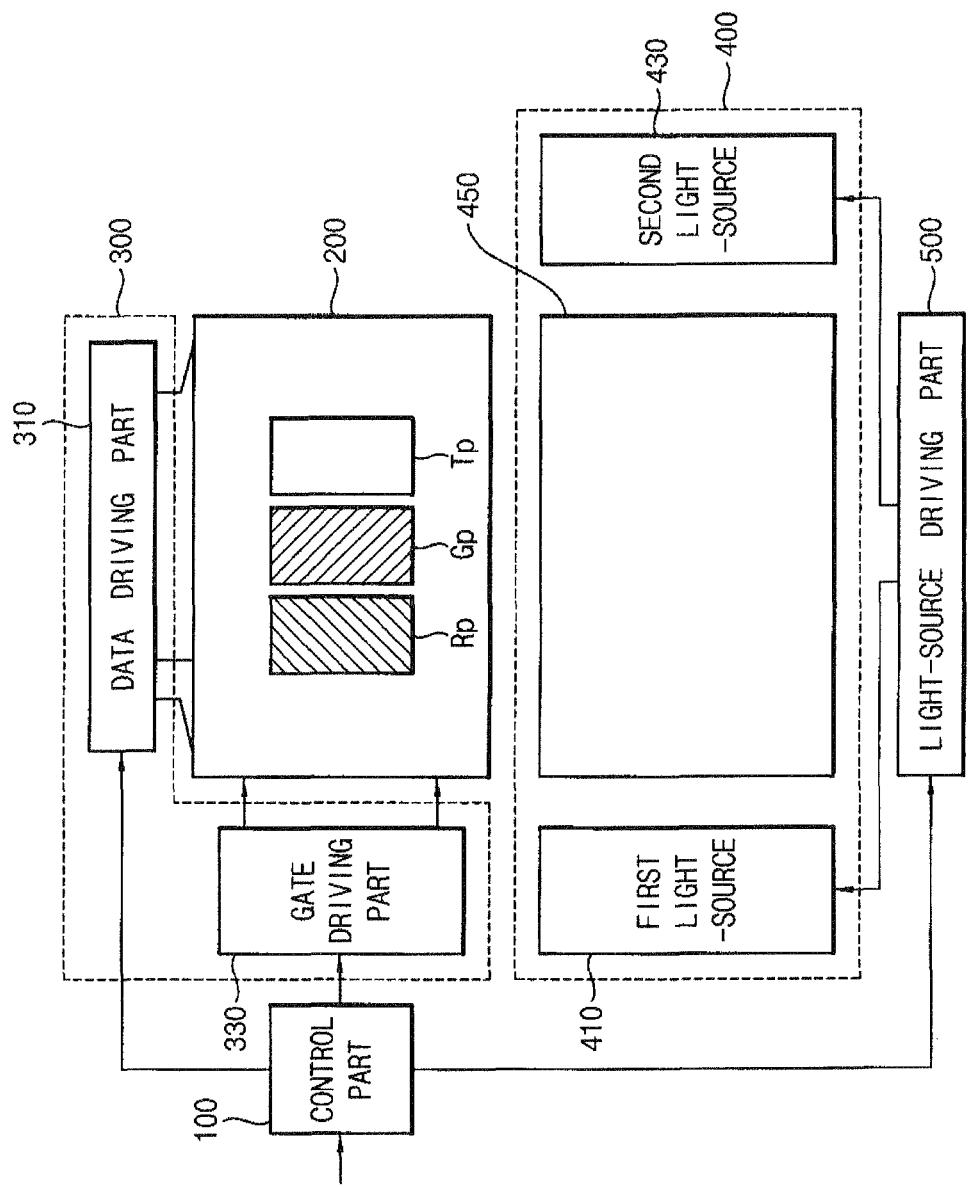
FIG. 1 is a block diagram illustrating a display apparatus according to an exemplary embodiment of the present invention.
Figure 2:
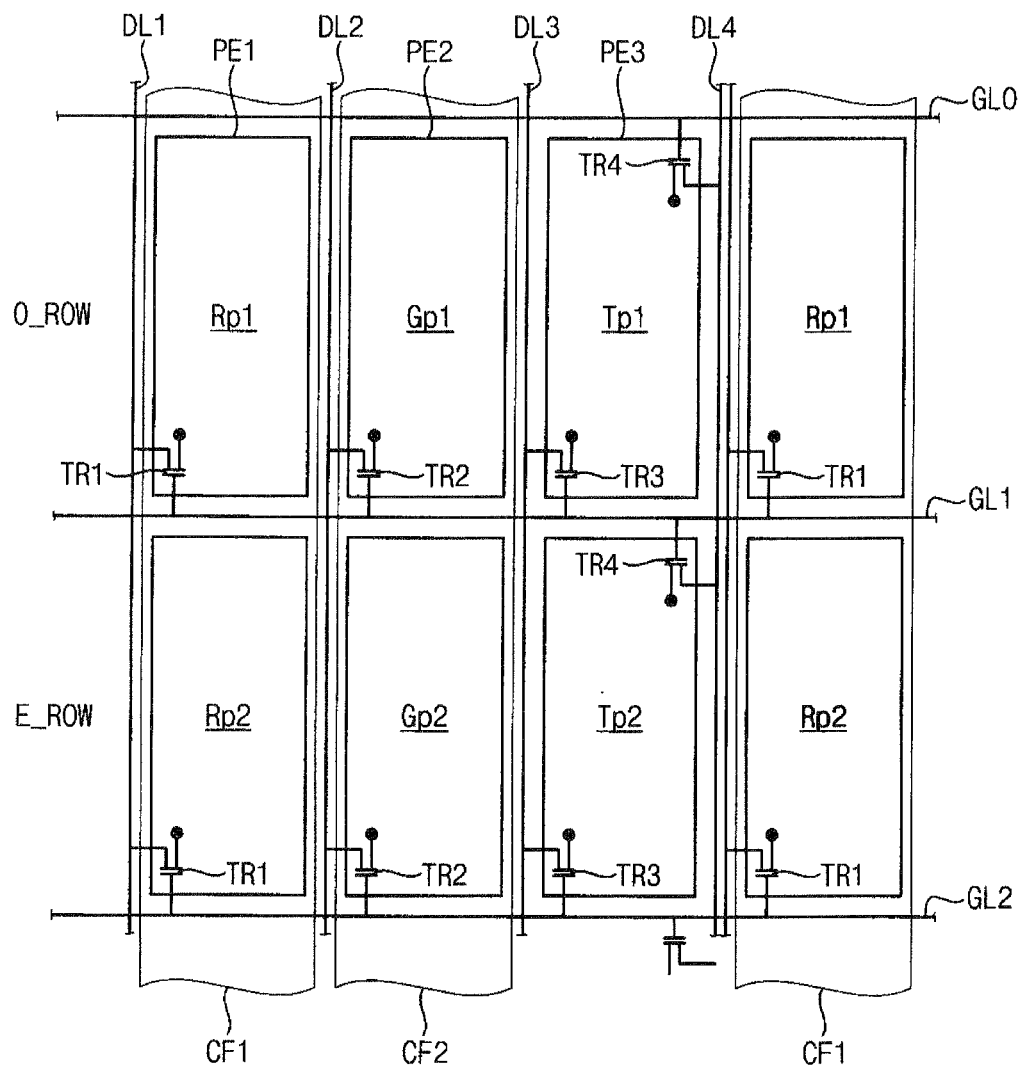
FIG. 2 is a diagram illustrating a pixel structure of a display panel shown in FIG. 1, according to an exemplary embodiment of the present invention.
Figure 3A:
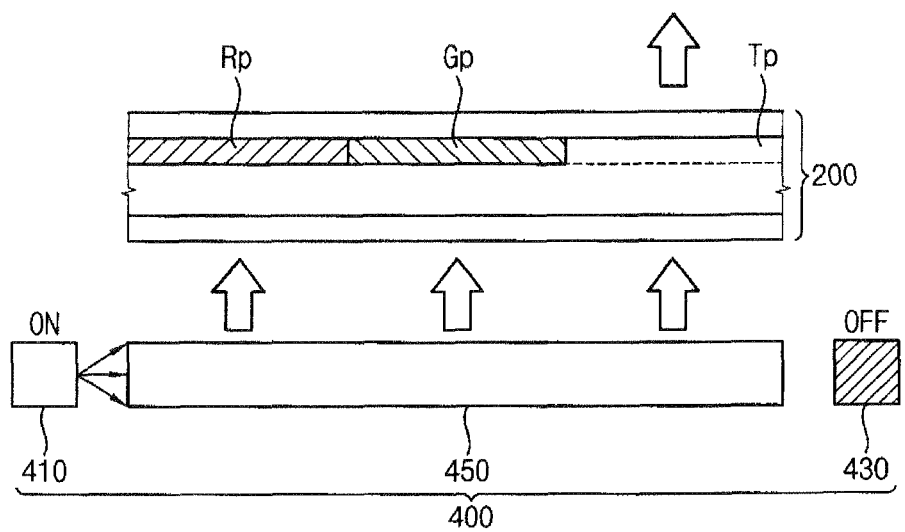
FIGS. 3A and 3B are diagrams illustrating a method of driving the display apparatus shown in FIG. 1, according to an exemplary embodiment of the present invention.
Figure 3B:
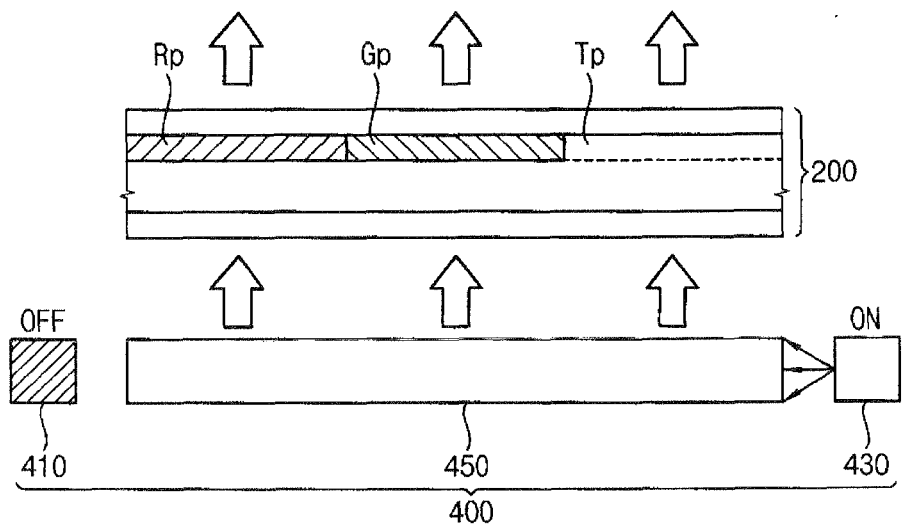

FIG. 1 is a block diagram illustrating a display apparatus according to an exemplary embodiment of the present invention. FIG. 2 is a diagram illustrating a pixel structure of a display panel shown in FIG. 1, according to an exemplary embodiment of the present invention. FIGS. 3A and 3B are diagrams illustrating a method of driving the display apparatus shown in FIG. 1, according to an exemplary embodiment of the present invention.

Referring to FIGS. 1 and 2, the display apparatus may include a control part 100, a display panel 200, a panel driving part 300, a light-source part 400 and a light-source driving part 500.

The control part 100 receives a synchronization signal and an image data signal and controls driving timings of the panel driving part 300 and the light-source driving part 500 based on the synchronization signal. The control part 100 corrects the image data signal using various correction algorithms and provides the panel driving part 300 with the corrected image data signal. In addition, according to the present exemplary embodiment, the control part 100 performs a subpixel rendering operation for a subpixel of the display panel 200 based on a color light generated by the light-source part 400 and provides the panel driving part 300 with a data signal rendered by the subpixel rendering operation. Hereinafter, the subpixel rendering operation in accordance with the present exemplary embodiment is explained.

The display panel 200 may include a plurality of subpixels for displaying an image. Each of the subpixels may include a transistor TR connected to at least one data line DL and at least one gate line GL, a liquid crystal capacitor and a storage capacitor. The transistor TR may be a thin film transistor.

According to the present exemplary embodiment, a pixel structure of the display panel 200, as shown in FIG. 2, includes a first color subpixel Rp having a first primary color, a second color subpixel Gp having a second primary color and a transparent subpixel Tp. The first color subpixel Rp and the second color subpixel Gp may each be a color formed by a combination of colors.

In the present exemplary embodiment, the first primary color may be red R, and thus the first color subpixel Rp may be a red subpixel. The second primary color may be green G, and thus the second color subpixel Gp may be a green subpixel. Alternatively, the first primary color may be green, and the second primary color may be blue. Alternatively, the first primary color may be red and the second primary color may be blue.

The subpixels may be arranged in a matrix including a plurality of pixel rows and a plurality of pixel columns. For example, a data line DL is electrically connected to a plurality of subpixels in a pixel column and a gate line GL is electrically connected to a plurality of subpixels in a pixel row.

An odd-numbered pixel row O_ROW includes a first red subpixel Rp1, a first green subpixel Gp1 and a first transparent subpixel Tp1. However, other color subpixels may be included in an odd-numbered pixel row. Further, the arrangement of the subpixels in an odd-numbered row is not limited to that shown in FIG. 2 and may be red, green, two transparent, then red subpixels in sequence, for example.

The first red subpixel Rp1 includes a first transistor TR1 connected to a first data line DL1 and a first gate line GL1, a first pixel electrode PE1 connected to the first transistor TR1 and a red color filter CF1 overlapping the first pixel electrode PE1 and extending in an extending direction of the first data line DL1.

The first green subpixel Gp1 includes a second transistor TR2 connected to a second data line DL2 and the first gate line GL1, a second pixel electrode PE2 connected to the second transistor TR2 and a green color filter CF2 overlapping the second pixel electrode PE2 and extending in an extending direction of the second data line DL2.

The first transparent subpixel Tp1 includes a third transistor TR3, a fourth transistor TR4 and a third pixel electrode PE3. The third transistor TR3 is connected to a third data line DL3 and the first gate line GL1, the fourth transistor TR4 is connected to a fourth data line DL4 and an even-numbered gate line GL0 disposed adjacent to the first gate line GL1. The third pixel electrode PE3 is electrically connected to the third and fourth transistors TR3 and TR4. The first transparent subpixel Tp1 does not include a color filter. In other words, the color filter is not formed in a transparent area in which the third pixel electrode PE3 is formed, so that the light generated by the light-source part 400 may be transmitted through the transparent area without being color filtered.

An even-numbered pixel row E_ROW adjacent to the odd-numbered pixel row O_ROW may include a second red subpixel Rp2, a second green subpixel Gp2 and a second transparent subpixel Tp2. However, other color subpixels may be included in an even-numbered pixel row. Further, the arrangement of the subpixels in an even-numbered row is not limited to that shown in FIG. 2 and may be green, red, two transparent, then red subpixels in sequence, for example. Each of the subpixels included in the even-numbered pixel row E_ROW may have substantially the same structure as those to which they correspond in the odd-numbered pixel row O_ROW.

For example, the second red subpixel Rp2 is electrically connected to the first data line DL1 and a second gate line GL2, that is an even-numbered gate line adjacent to the first gate line GL1, the second green subpixel Gp2 is electrically connected to the second data line DL2 and the second gate line GL2, and the second transparent subpixel Tp2 is electrically connected to the third data line DL3, the fourth data line DL4, the first gate line GL1 and the second gate line GL2. In addition, the second red subpixel Rp2 includes the red color filter CF1, the second green subpixel Gp2 includes the green color filter CF2 and the second transparent subpixel Tp2 does not include a color filter.

As described above, according to the present exemplary embodiment, in a pixel structure, each of the red and green subpixels is connected to the odd-numbered or even-numbered gate line through one transistor. The transparent subpixel is connected to the odd-numbered and even-numbered gate lines through two transistors.

The panel driving part 300 includes a data driving part 310 and a gate driving part 330. The data driving part 310 generates a data voltage according to a control of the control part 100 and provides the data line DL of the display panel 200 with the data voltage. The gate driving part 330 generates a gate signal according to a control of the control part 100 and provides the gate line GL of the display panel 200 with the gate signal.

The light-source part 400 sequentially provides the display panel 200 with different color lights from each other. The light-source part 400 includes a first light-source 410, a second light-source 430 and a light guide plate 450.

The first light-source 410 generates a third primary color. The third primary color may be blue. Alternatively, the third primary color may be green or red.

The second light-source 430 generates a mixed color by mixing the first primary color and the second primary color.

When the first primary color is red and the second primary color is green, the mixed color is yellow.

Alternatively, when the first primary color is red and the second primary color is blue, the mixed color may be magenta. When the first primary color is green and the second primary color is blue, the mixed color may be cyan.

When the mixed color is yellow, the third primary color is blue. When the mixed color is magenta, the third primary color is green. When the mixed color is cyan, the third primary color may be red.

The first, second and third primary colors are mixed so that the mixed color may be white. In the present exemplary embodiment, the first, second and third primary colors may be respectively referred to as red, green and blue, but are not limited thereto.

In the present exemplary embodiment, the third primary color may also be referred to as blue in which case the mixed color may be referred to as yellow.

According to the present exemplary embodiment, the first light-source 410 may be a light emitting diode ("LED") chip for generating a blue light. The second light-source 430 may be an LED chip for generating a yellow light.

The light guide plate 450 guides the light generated by the first and second light-sources 410 and 430 toward the display panel 200.

The first light-source 410 may be disposed at a first side of the light guide plate 450 and the second light-source 430 may be disposed at a second side of the light guide plate 450.

Although not shown in figures, the first light-source 410 and the second light-source 430 may be formed as one package so that the package may be disposed at a side of the light guide plate 450. The first light-source 410 and the second light-source 430 may be formed as one chip using a blue LED and a yellow fluorescent material.

According to the present exemplary embodiment, the light-source part 400 may be referred to as an edge-illumination type which includes the first and second light-sources 410 and 430 disposed at both sides of the light guide plate 450; however, the present invention is not limited thereto. For example, the light-source part 400 may be referred to as a direct-illumination type which includes at least one light-source disposed under the display panel 200 and corresponding to an entire area of the display panel 200.

The light-source driving part 500 drives the light-source part 400 in synchronization with a driving timing of the display panel 200 according to a control of the control part 100.

Referring to FIGS. 3A and 3B, during a frame, the light-source driving part 500 alternately turns on the first light-source 410 and the second light-source 430, and sequentially provides the display panel 200 different color lights from each other. For example, during a first sub frame of the frame, the light-source driving part 500 turns on the first light-source 410 and turns off the second light-source 430. Then, during a second sub frame of the frame, the light-source driving part 500 turns on the second light-source 430 and turns off the first light-source 410.

A period of the first sub frame and a period of the second sub frame may be the same as each other. Alternatively, the period of the first sub frame and a period of the second sub frame may be different from each other. For example, the display panel 200 may display images at a frame rate of 120 Hz. The light-source driving part 500 may alternately turn on the first and second light-sources 410 and 430 at a frequency of 120 Hz. However, the display panel 200 may display images at other frame rates, for example, 240 Hz. Thus, the light-source driving part 500 may alternately turn on the first and second light-sources 410 and 430 at a frequency of 240 Hz.

A subpixel rendering operation is explained according to the color light generated by the light-source part 400.

The control part 100 performs the subpixel rendering operation which sets grayscale data levels of the first color subpixel Rp, the second color subpixel Gp and the transparent subpixel Tp.

An input image data signal includes grayscale data of a first primary color, a second primary color and a third primary color. Here, A is a grayscale data level of the first primary color, B is a grayscale data level of the second primary color and C is a grayscale data level of the third primary color. Min(A,B) is a minimum value of A and B. Hereinafter, a first subpixel rendering method in accordance with an exemplary embodiment of the present invention is explained.

The control part 100 may set a grayscale data level of the transparent subpixel Tp to C during the first sub frame in which the first light-source 410 is turned on so that the third primary color light is provided to the display panel 200.

The control part 100 may set a grayscale data level of the first color subpixel Rp to A-min(A,B), a grayscale data level of the second color subpixel Gp to B-min(A,B) and a grayscale data level of the transparent subpixel Tp to min(A,B), during the second sub frame in which the second light-source 430 is turned on so that a mixed color light having the mixed color by mixing the first and second primary colors is provided to the display panel 200.

Next, A is again a grayscale data level of the first primary color, B is a grayscale data level of the second primary color and C is a grayscale data level of the third primary color.

Hereinafter, a second subpixel rendering method according to an exemplary embodiment of the present invention is explained.

The control part 100 may set the grayscale data level of the transparent pixel Tp to 2C during the first sub frame in which the first light-source 410 is turned on so that the third primary color light is provided to the display panel 200.

The control part 100 may set a grayscale data level of the first color subpixel Rp to A, a grayscale data level of the second color subpixel Gp to B and a grayscale data level of the transparent subpixel Tp to A+B, during the second sub frame in which the second light-source 430 is turned on so that a mixed color light having the mixed color by mixing the first and second primary colors is provided to the display panel 200. In the second subpixel rendering method, the display panel 200 may have a higher luminance compared to that of the first subpixel rendering method.

Figure 4A:
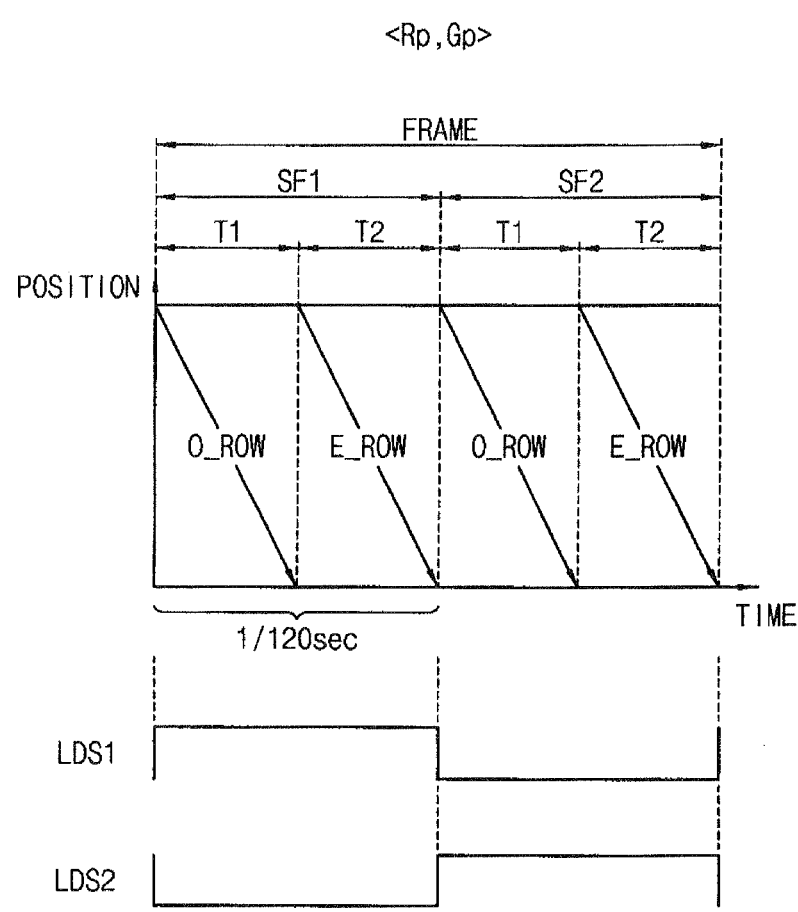
FIGS. 4A and 4B are diagrams illustrating a method of driving the display panel shown in FIG. 2, according to an exemplary embodiment of the present invention.
Figure 4B:
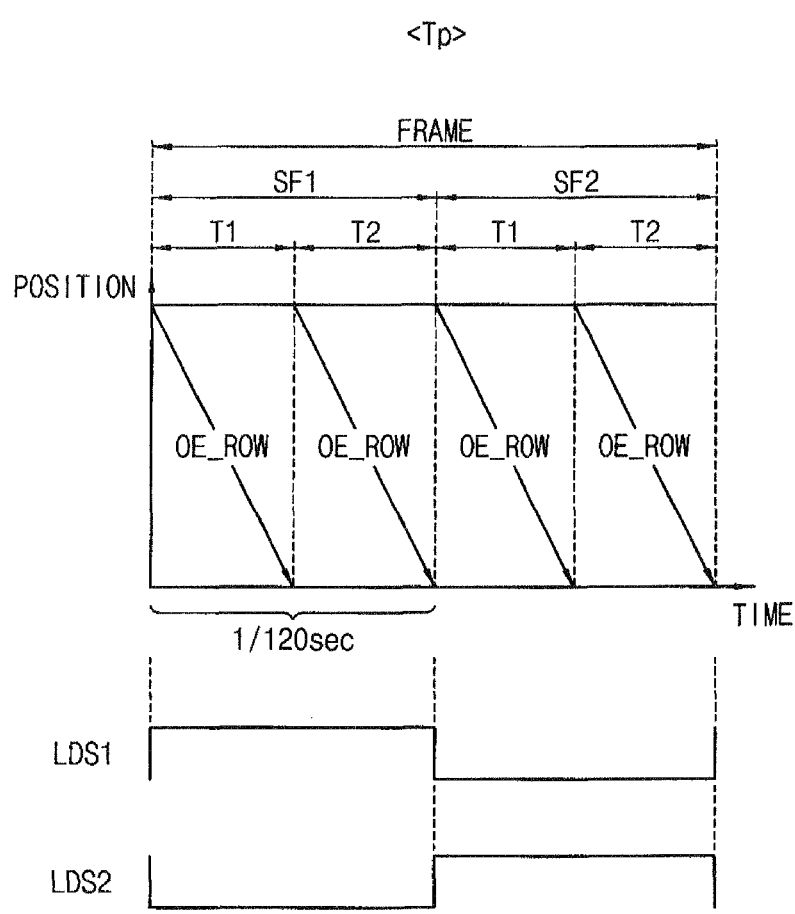

FIGS. 4A and 4B are diagrams illustrating a method of driving the display panel shown in FIG. 2, according to an exemplary embodiment of the present invention.

FIG. 4A is a diagram illustrating a method of driving a red subpixel and a green subpixel and FIG. 4B is a diagram illustrating a method of driving a transparent subpixel.

Referring to FIGS. 1, 2, 4A and 4B, the control part 100 provides the panel driving part 300 with first sub frame data set by the subpixel rendering method corresponding to blue light during the first sub frame SF1. The panel driving part 300 drives the display panel 200 using the first sub frame data.

During the first sub frame SF1 of the frame, the light-source part 400 turns on the first light-source 410 and turns off the second light-source 430, in response to first and second light-source driving signals LDS1 and LDS2. Therefore, the light-source part 400 provides the display panel 200 with the blue light generated by the first light-source 410.

The first sub frame SF1 includes a first period T1 and a second period T2. The first period T1 is a period in which the odd-numbered gate lines of a plurality of the gate lines GL in the display panel 200 are driven. The second period T2 is a period in which the even-numbered gate lines of the gate lines GL in the display panel 200 are driven.

Referring to FIGS. 2 and 4A, during the first period T1 of the first sub frame SF1, when the gate signal is applied to the odd-numbered gate line, in other words, the first gate line GL1, a first red data signal transferred from the first data line DL1 is applied to the first red subpixel Rp1 in the odd-numbered pixel row O_ROW and a first green data signal transferred from the second data line DL2 is applied to the first green subpixel Gp1 in the odd-numbered pixel row O_ROW. During the first period T1, red and green subpixels connected to the even-numbered gate lines GL, for example, the second red subpixel Rp2 and second green subpixel Gp2 in the even-numbered pixel row E_ROW do not receive data signals.

Then, during the second period T2 of the first sub frame SF1, when the gate signal is applied to the even-numbered gate line, in other words, the second gate line GL2, a second red data signal transferred from the first data line DL1 is applied to the second red subpixel Rp2 in the even-numbered pixel row E_ROW and a second green data signal transferred from the second data line DL2 is applied to the second green subpixel Gp2 in the even-numbered pixel row E_ROW. During the second period T2 of the first sub frame SF1, red and green subpixels connected with the odd-numbered gate line, for example, the first red subpixel Rp1 and the first green subpixel Gp1 in the odd-numbered pixel row O_ROW do not receive data signals.

As described above, the red and green subpixels of the odd-numbered pixel row O_ROW receive data signals during the first period T1 of the first sub frame SF1 and the red and green subpixels of the even-numbered pixel row E_ROW receive data signals during the second period T2 of the first sub frame SF 1.

Referring to FIGS. 2 and 4B, during the first period T1 of the first sub frame SF1, when the gate signal is applied to the odd-numbered gate line, in other words, the first gate line GL1, the first transparent subpixel Tp1 in the odd-numbered pixel row O_ROW receives the first data signal transferred from the third data line DL3 through the third transistor TR3 connected to the first gate line GL1. The second transparent subpixel Tp2 in the even-numbered pixel row E_ROW receives the second data signal transferred from the fourth data line DL4 through the fourth transistor TR4 connected to the first gate line GL1.

During the first period T1, the first and second transparent subpixels Tp1 and Tp2 in the odd-numbered and even-numbered pixel rows OE_ROW respectively receive the first and second data signals transferred from the third and fourth data lines DL3 and DL4.

Therefore, during the first period T1, the first transparent subpixel Tp1 in the odd-numbered pixel row O_ROW and the second transparent subpixel Tp2 in the even-numbered pixel row E_ROW may be driven.

Then, during the second period T2 of the first sub frame SF1, when the gate signal is applied to the even-numbered gate line, in other words, the second gate line GL2, the second transparent subpixel Tp2 in the even-numbered pixel row E_ROW receives the first data signal transferred from the third data line DL3 through the third transistor TR3. The first transparent subpixel Tp1 in the odd-numbered pixel row O_ROW receives the second data signal transferred from the fourth data line DL4 through the fourth transistor TR4 connected to the even-numbered gate line GL0.

During the second period T2, the first and second transparent subpixels Tp1 and Tp2 in the odd-numbered and even-numbered pixel rows OE_ROW respectively receive the first and second data signals transferred from the third and fourth data lines DL3 and DL4.

Therefore, during the second period T2, the second transparent subpixel Tp2 in the even-numbered pixel row E_ROW and the first transparent subpixel Tp1 in the odd-numbered pixel row O_ROW may be driven.

Then, during the second sub frame SF2 of the frame, the light-source part 400 turns off the first light-source 410 and turns on the second light-source 430 in response to the first and second light-source driving signals LDS1 and LDS2. Therefore, the light-source part 400 provides the display panel 200 with the mixed color light, in other words, the yellow light generated from the second light-source 430.

The control part 100 provides the panel driving part 300 with second sub frame data set to the yellow light during the second sub frame SF2. The panel driving part 300 drives the display panel 200 using the first sub frame data. The panel driving part 300 drives the display panel 200 using the second sub frame data.

During the first period T1 of the second sub frame SF2, when the gate signal is applied to the odd-numbered gate line, in other words, the first gate line GL1, the first red subpixel Rp1 receives a third red data signal transferred from the first data line DL1, and the first green subpixel Gp1 receives a third green data signal transferred from the second data line DL2. During the first period T1 of the second sub frame SF2, red and green subpixels connected to the even-numbered gate line, for example, the second red subpixel Rp2 and second green subpixel Gp2 do not receive the data signal.

Then, during the second period T2 of the second sub frame SF2, when the gate signal is applied to the even-numbered gate line, in other words, the second gate line GL2, the second red subpixel Rp2 receives a fourth red data signal transferred from the first data line DL1, and the second green subpixel Gp2 receives a fourth green data signal transferred from the second data line DL2. During the second period T2 of the second sub frame SF2, red and green subpixels connected to the odd-numbered gate line, for example, the first red subpixel Rp1 and the first green subpixel Gp1 do not receive the data signal.

As described above, the red and green subpixels connected to the odd-numbered gate line receive data signals during the first period T1 of the second sub frame SF2 and the red and green subpixels connected to the even-numbered gate line receive data signals during the second period T2 of the second sub frame SF2.

Referring to FIGS. 2 and 4B, during the second period T2 of the second sub frame SF2, when the gate signal is applied to the odd-numbered gate line, in other words, the first gate line GL1, the first transparent subpixel Tp1 in the odd-numbered pixel row O_ROW receives a third data signal transferred from the third data line DL3 through the third transistor TR3. The second transparent subpixel Tp2 in the even-numbered pixel row E_ROW receives a fourth data signal transferred from the fourth data line DL4 through the fourth transistor TR4 connected to the first gate line GL1.

During the first period T1 of the second sub frame SF2, the transparent subpixels Tp1 and Tp2 in the odd-numbered and the even-numbered pixel rows O_ROW and E_ROW receive the first and second data signals transferred from the third and fourth data lines DL3 and DL4.

Then, during the second period T2 of the second sub frame SF2, when the gate signal is applied to the even-numbered gate line, in other words, the second gate line GL2, the second transparent subpixel Tp2 in the even-numbered pixel row E_ROW receives a third data signal transferred from the third data line DL3 through the third transistor TR3. The first transparent subpixel Tp1 in the odd-numbered pixel row O_ROW receives a fourth data signal transferred from the fourth data line DL4 through the fourth transistor TR4 connected to the even-numbered gate line GL0.

During the second period T2 of the second sub frame SF2, the transparent subpixels Tp1 and Tp2 in the odd-numbered and the even-numbered pixel rows O_ROW and E_ROW receive the first and second data signals transferred from the third and fourth data lines DL3 and DL4.

According to the present exemplary embodiment, the transparent subpixel is driven at twice the frequency than a frequency of the red and green subpixels, so that a data response time of the transparent subpixel may be increased.

To increase the data response time of the transparent subpixel Tp, the data signal applied to the transparent subpixel Tp during the first period T1 of the sub frame may be the same as or different from the data signal applied to the transparent subpixel Tp during the second period T2 of the sub frame. For example, during the first period T1 of the sub frame, the data signal set according to the color light generated by the light-source part 400 may be applied to the transparent subpixel Tp. During the second period T2 of the sub frame, a black data signal of a black grayscale operating as refresh data signal may be applied to the transparent subpixel Tp so that the data response time of the transparent subpixel may be increased.

Figure 5:
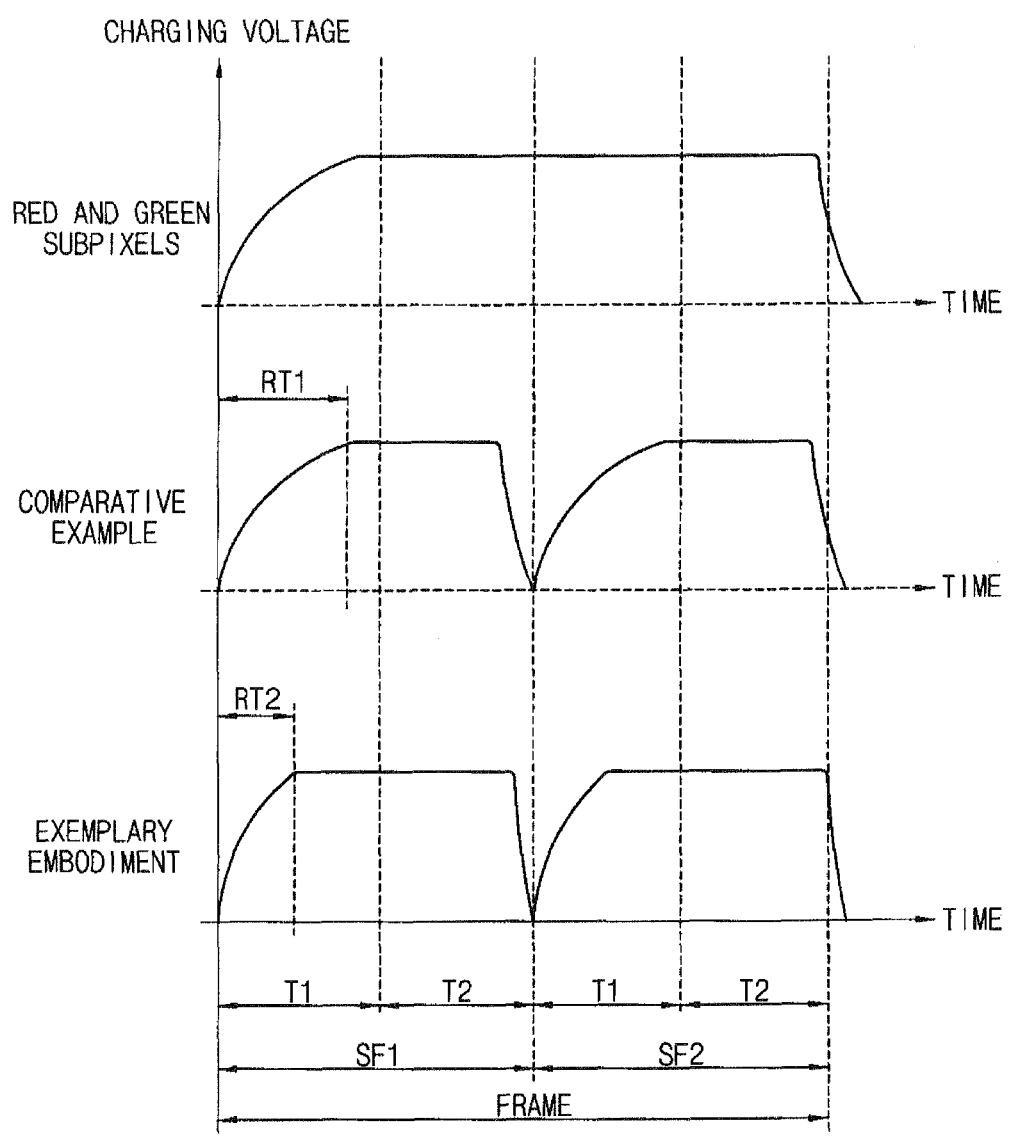
FIG. 5 is a diagram illustrating data charging conditions of a color subpixel and a transparent subpixel according to an exemplary embodiment of the present invention.

FIG. 5 is a diagram illustrating data charging conditions of a color subpixel and a transparent subpixel according to an exemplary embodiment of the present invention.

Referring to FIGS. 1 and 5, the red and green subpixels Rp and Gp may receive the same data signal during the first sub frame SF1 and the second sub frame SF2.

During the first sub frame SF1 in which the light-source part 400 generates the blue light, the red and green subpixels Rp and Gp do not transmit the blue light. Thus, the data signals applied to the red and the green subpixels Rp and Gp during the first sub frame SF1 may be used for pre-charging.

During the second sub frame SF2 during which the light-source part 400 generates the yellow light, the red and green subpixels Rp and Gp may display color images. During the second sub frame SF2, the red and green subpixels Rp and Gp receive substantially the same data signal as the data signal applied to the red and green subpixels Rp and Gp during the first sub frame SF1.

Therefore, the red and green subpixels Rp and Gp precharge the data signal during the first sub frame SF1 so that the data response time may be improved.

According to a comparative example, referring to the charging condition of the transparent subpixel Tp, the transparent subpixel Tp receives a first data signal to display a blue image corresponding to the blue light during the first sub frame SF1. Then, the transparent subpixel Tp receives a second data signal to display a white image corresponding to the yellow light during the second sub frame SF2. As just described, the transparent subpixel Tp receives a different data signal each sub frame.

According to the comparative example, the data signal charged in the transparent subpixel Tp has a first response time RT1.

In contrast, referring to the charging condition of the transparent subpixel Tp according to an exemplary embodiment of the invention, the transparent subpixel Tp receives a first data signal during a first period T1 of the first sub frame SF1 to display a blue image corresponding to the blue light and receives the first data signal during a second period T2 of the first sub frame SF1 to display the blue image corresponding to the blue light. In addition, the transparent subpixel Tp receives a second data signal during a first period T1 of the second sub frame SF2 to display a white image corresponding to the yellow light and receives the second data signal during a second period T2 of the second sub frame SF2 to display the white image corresponding to the yellow light.

The data signal charged in the transparent subpixel Tp according to the exemplary embodiment of the invention has a second response time RT2 shorter than the first response time RT1 of the comparative example.

Therefore, according to the present exemplary embodiment, the data response time of the transparent subpixel Tp may be increased.

Figure 6:
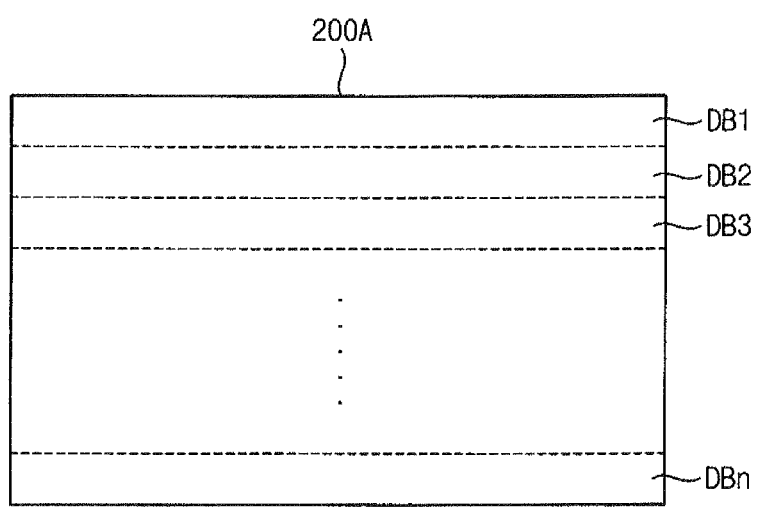
FIG. 6 is a block diagram illustrating a display apparatus according to an exemplary embodiment of the present invention.
Figure 6:
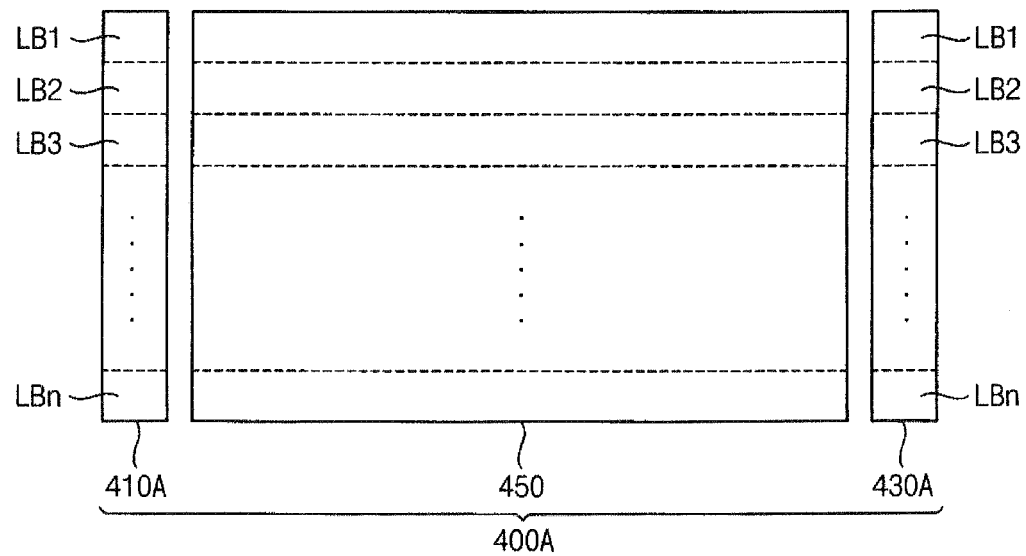
Figure 7B:
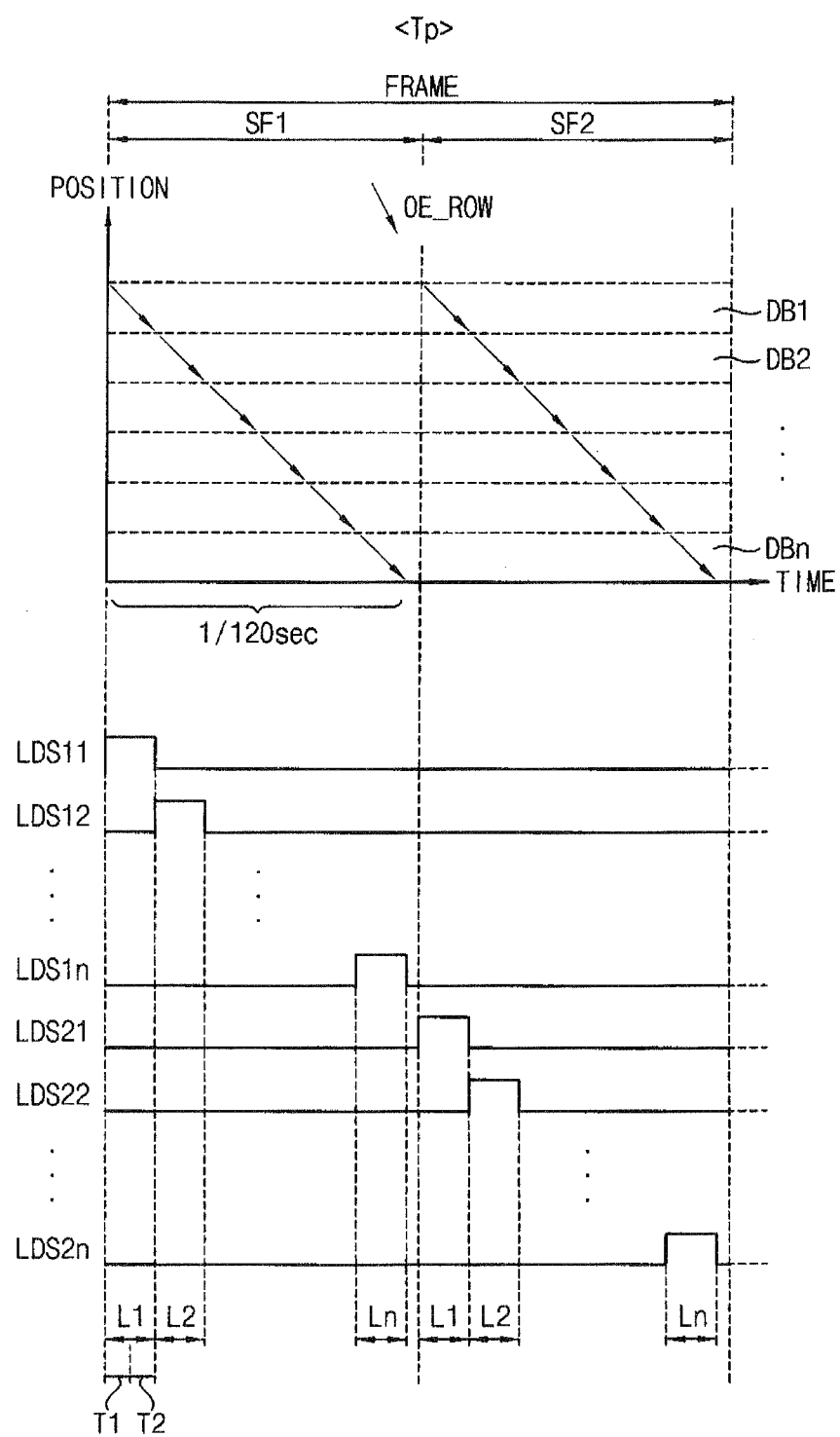

FIG. 6 is a block diagram illustrating a display apparatus according to an exemplary embodiment of the present invention. FIGS. 7A and 7B are diagrams illustrating a method of driving the display apparatus shown in FIG. 6, according to an exemplary embodiment of the present invention.

The display apparatus according to the present exemplary embodiment includes substantially the same elements as those described in reference to FIG. 1, except for a light-source part and a display panel, and thus, repetitive explanations may be omitted.

Referring to FIGS. 1 and 6, a display panel 200A according to the present exemplary embodiment, may be divided into a plurality of display blocks DB1, DB2, DB3, ..., DBn.

The panel driving part 300 individually drives the display blocks DB1, DB2, DB3, ..., DBn of the display panel 200A.

A light-source part 400A includes a first light-source 410A, a second light-source 430A and a light guide plate 450. The first and second light-sources 410A and 430A are divided into a plurality of light-emitting blocks LB1, LB2, LB3, ..., LBn corresponding to the plurality of display blocks DB1, DB2, DB3, ..., DBn. The first light-source 410A generates a third primary color and the second light-source 430A generates a mixed color light having a mixed color by mixing the first and second primary colors.

The light-source driving part 500 sequentially drives the light-emitting blocks LB1, LB2, LB3, ..., LBn of the first light-source 410A in synchronization with an image sequentially displayed in the display blocks DB1, DB2, DB3, ..., DBn during a first sub frame of a frame. In addition, the light-source driving part 500 turns off the second light-source 430A during the first sub frame of the frame. And then, the light-source driving part 500 sequentially drives the light-emitting blocks LB1, LB2, LB3, ..., LBn of the second light-source 430A in synchronization with an image sequentially displayed in the display blocks DB1, DB2, DB3, ..., DBn during a second sub frame of the frame. In addition, the light-source driving part 500 turns off the first light-source 410A during the second sub frame of the frame.

Referring to FIGS. 1, 2, 6, 7A and 7B, during the first sub frame SF1, the control part 100 provides the panel driving part 300 with first sub frame data set by the subpixel rendering method corresponding to a blue light. The panel driving part 300 drives the display panel 200A using the first sub frame data.

During the first sub frame SF1, the light-source part 400A sequentially turns on the plurality of light-emitting blocks LB1, LB2, LB3, ..., LBn of the first light-source 410A and turns off the second light-source 430A, in response to a plurality of first light-source driving signals LDS11, LDS12, ..., LDS1n and a plurality of second light-source driving signals LDS21, LDS22, ..., LDS2n. The first light-source 410A generates the blue light.

During a first period T1 of a first light-emitting period L1, an odd-numbered gate line in a first display block DB1 is driven, and during a second period T2 of the first light-emitting period L1, an even-numbered gate line in the first display block DB1 is driven. The first light-emitting period L1 is a period during which a first light-emitting block LB1 corresponding to the first display block DB1 is turned on.

Referring to FIGS. 2 and 7A, during the first period T1, when the gate signal is applied to the odd-numbered gate line, in other words, the first gate line GL1, the first red subpixel Rp1 in the odd-numbered pixel row O_ROW receives a first red data signal transferred from the first data line DL1 and the first green subpixel Gp1 in the odd-numbered pixel row O_ROW receives a first green data signal transferred from the second data line DL2. However, during the first period T1, red and green subpixels connected to the even-numbered gate line, for example, the second red subpixel Rp2 and the second green subpixel Gp2 in the even-numbered pixel row E_ROW do not receive the data signal.

Then, during the second period T2, when the gate signal is applied to the even-numbered gate line, in other words, the second gate line GL2, the second red subpixel Rp2 in the even-numbered pixel row E_ROW receives a second red data signal transferred from the first data line DL1, and the second green subpixel Gp2 in the even-numbered pixel row E_ROW receives a second green data signal transferred from the second data line DL2. However, during the second period T2, red and green subpixels connected to the odd-numbered gate line, for example, the first red subpixel Rp1 and the first green subpixel Gp1 in the odd-numbered pixel row O_ROW do not receive the data signal.

As described above, the red and green subpixels connected to the odd-numbered gate line receive data signals during the first period T1 of the first light-emitting period L1 and the red and green subpixels connected to the even-numbered gate line receive data signals during the second period T2 of the first light-emitting period L1.

However, referring to FIGS. 2 and 7B, during the first period T1, when the gate signal is applied to the odd-numbered gate line, in other words, the first gate line GL1, the first transparent subpixel Tp1 in the odd-numbered pixel row O_ROW receives a first data signal transferred from the third data line DL3 through the third transistor TR3. However, the second transparent subpixel Tp2 in the even-numbered pixel row E_ROW receives a second data signal transferred from the fourth data line DL4 through the fourth transistor TR4 connected to the first gate line GL1.

During the first period T1, the transparent subpixels Tp1 and Tp2 in the odd-numbered and the even-numbered pixel rows O_ROW and E_ROW receive the first and second data signals transferred from the third and fourth data lines DL3 and DL4.

According to the present exemplary embodiment, in the first sub frame SF1, the light-emitting period of each of the first to n-th light-emitting blocks LB1, LB2, LB3, ..., LBn is divided into first and second periods T1 and T2. During the first period T1 of the light-emitting period, the odd-numbered gate line in each of the display blocks DB1, DB2, DB3, ..., DBn is driven and during the second period T2 of the light-emitting period, the even-numbered gate line of each of the display blocks DB1, DB2, DB3, ..., DBn is driven. As described above, the subpixel in the first to n-th display blocks DB1, DB2, DB3, ..., DBn may be driven.

Then, during the second sub frame SF2, the light-source part 400A turns off the light-emitting blocks LB1, LB2, LB3, ..., LBn of the first light-source 410A and sequentially turns on a plurality of light-emitting blocks LB1, LB2, LB3, ..., LBn of the second light-source 430A, in response to a plurality of first light-source driving signals LDS11, LDS12, ..., LDS1n and a plurality of second light-source driving signals LDS21, LDS22, ..., LDS2n. The second light-source 430A generates a yellow light.

During the second sub frame SF2, the control part 100 provides the display panel 200A with the first sub frame data set by the subpixel rendering method corresponding to the yellow light. The panel driving part 300 drives the display panel 200A using the first sub frame data.

For example, during a first period T1 of a first light-emitting period L1 of the second sub frame SF2, an odd-numbered gate line in the first display block DB1 is driven, and during a second period T2 of the first light-emitting period L1 of the second sub frame SF2, an even-numbered gate line in the first display block DB1 is driven. The first light-emitting period L1 of the second sub frame SF2 is a period in which a first light-emitting block LB1 of the second light source 430A corresponding to the first display block DB1 is turned on.

A method of driving the first display block DB1 in the second sub frame SF2 is substantially the same as the method of driving the first display block DB1 in the first sub frame SF1, and thus repetitive explanations may be omitted.

As described above, in the second sub frame SF2, the light-emitting period of each of the first to n-th light-emitting blocks LB1, LB2, LB3, ..., LBn is divided into first and second periods T1 and T2. During the first period T1 of the light-emitting period, the odd-numbered gate line in each of the display blocks DB1, DB2, DB3, ..., DBn is driven, and then during the second period T2 of the light-emitting period, the even-numbered gate line of each of the display blocks DB1, DB2, DB3, ..., DBn is driven. As described above, the subpixel in the first to n-th display blocks DB1, DB2, DB3, ..., DBn may be driven.

According to the present exemplary embodiment, the transparent subpixel is driven at twice the frequency than a frequency of the red and green subpixels, so that a data response time of the transparent subpixel may be increased.

Figure 8A:
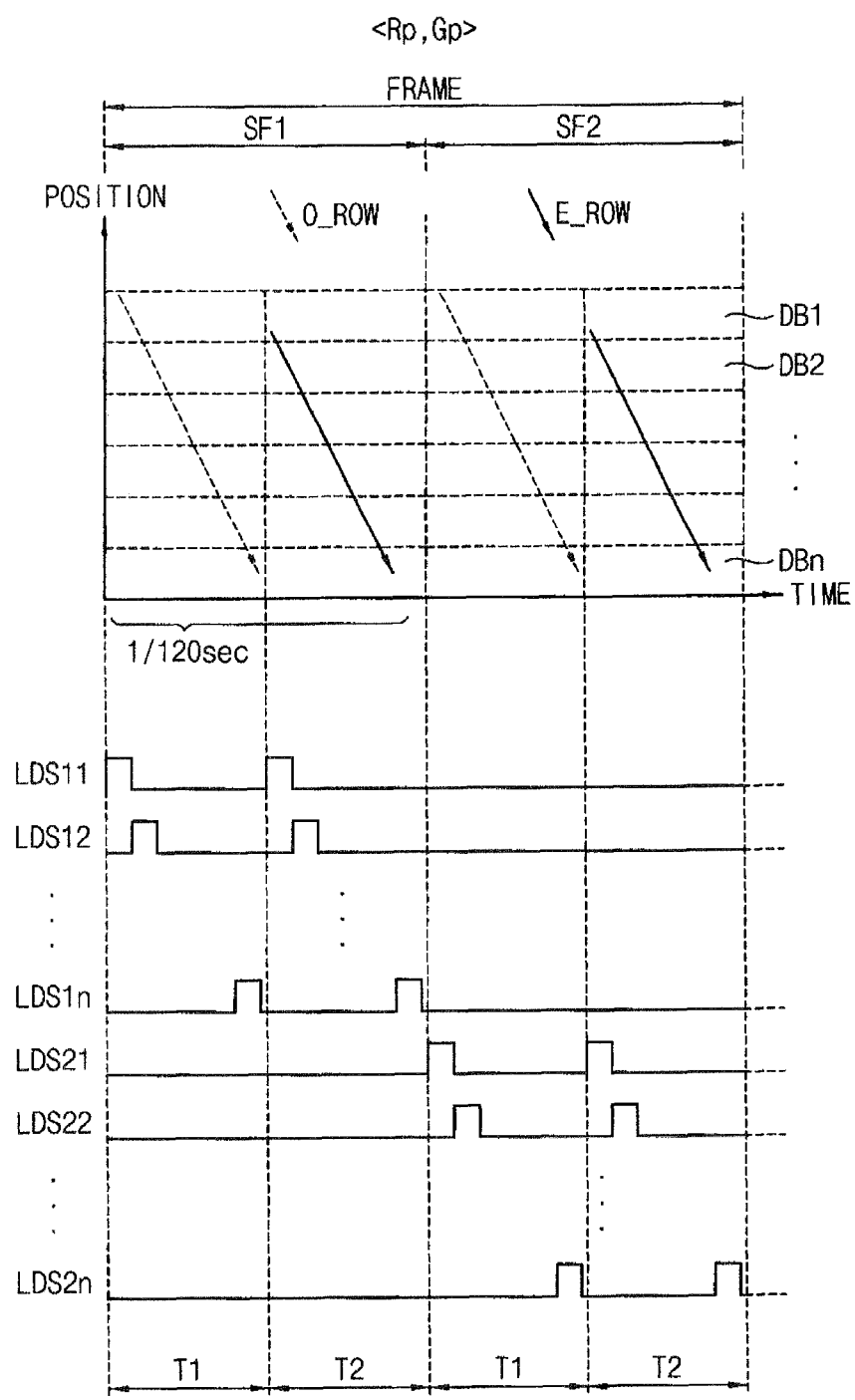
FIGS. 8A and 8B are diagrams illustrating a method of driving the display apparatus shown in FIG. 6 according to an exemplary embodiment of the present invention.
Figure 8B:
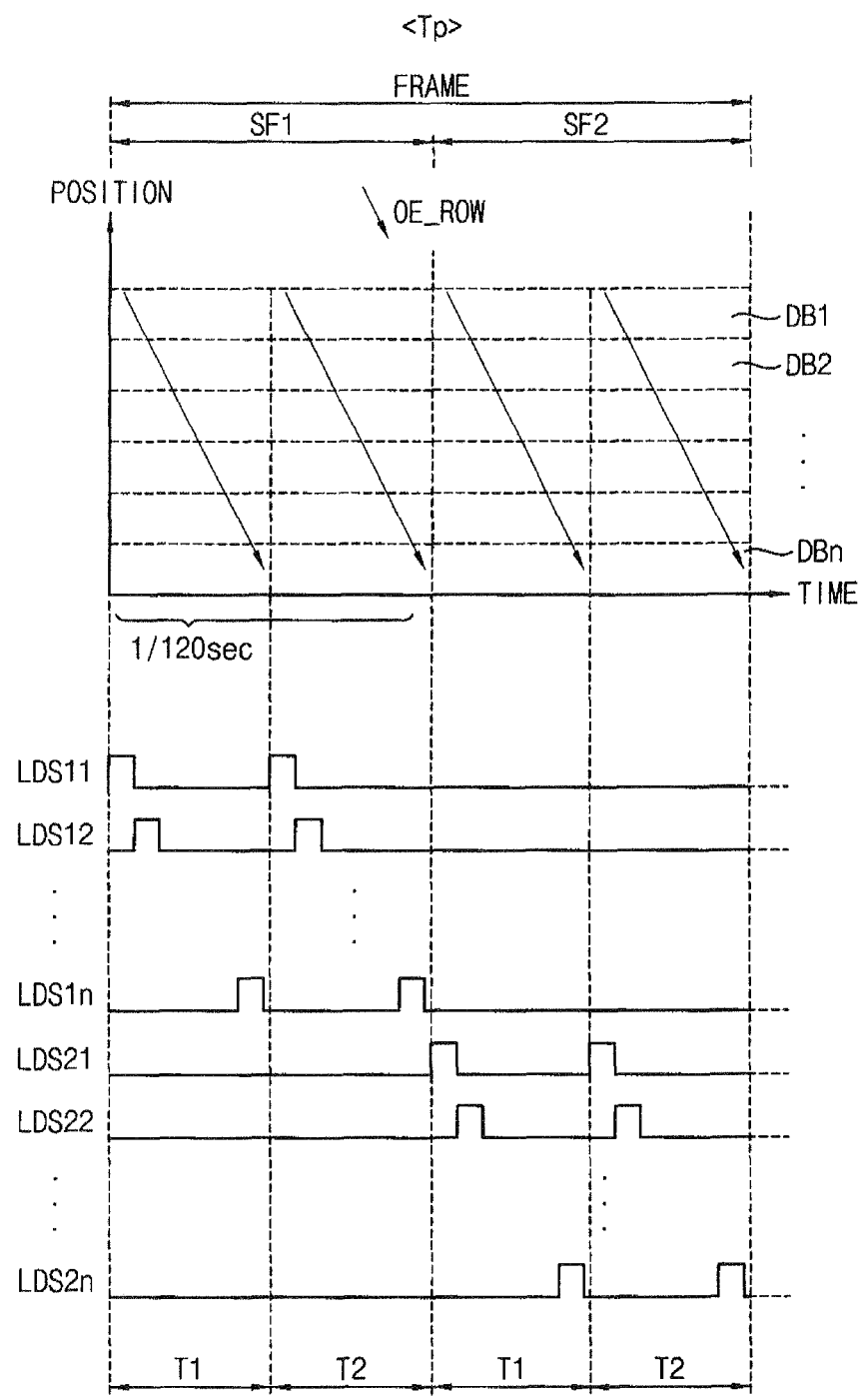

FIGS. 8A and 8B are diagrams illustrating a method of driving the display apparatus shown in FIG. 6 according to an exemplary embodiment of the present invention.

Referring to FIGS. 1, 2, 6, 8A and 8B, during the first sub frame SF1, the control part 100 provides the panel driving part 300 with first sub frame data set by the subpixel rendering method corresponding to the blue light. The panel driving part 300 drives the display panel 200A using the first sub frame data.

Referring to FIGS. 2 and 8A, during a first period T1 of the first sub frame SF1, the light-source part 400A sequentially turns on a plurality of light-emitting blocks LB1, LB2, LB3, ..., LBn in the first light-source 410A and turns off the second light-source 430A, in response to a plurality of first light-source driving signals LDS11, LDS12, ..., LDS1n and a plurality of second light-source driving signals LDS21, LDS22, ..., LDS2n.

During the first period T1, the odd-numbered gate line in the display panel 200A is driven. For example, during the first period T1, when the gate signal is applied to the odd-numbered gate line, in other words, the first gate line GL1, the first red subpixel Rp1 and the first green subpixel Gp1 in the odd-numbered pixel row O_ROW receive data signals transferred from the first and second data lines DL1 and DL2. However, red and green subpixels connected to the even-numbered gate line, for example, the second red subpixel Rp2 and the second green subpixel Gp2 in the even-numbered pixel row E_ROW do not receive the data signals.

Then, during a second period T2 of the first sub frame SF1, the light-source part 400A sequentially turns on a plurality of light-emitting blocks LB1, LB2, LB3, ..., LBn in the first light-source 410A and turns off the second light-source 430A, in response to the plurality of first light-source driving signals LDS11, LDS12, ..., LDS1n and the plurality of second light-source driving signals LDS21, LDS22, ..., LDS2n. The first light-source 410A generates the blue light.

During the second period T2, the even-numbered gate line in the display panel 200A is driven. For example, during the second period T2, when the gate signal is applied to the even-numbered gate line, in other words, the second gate line GL2, the second red subpixel Rp2 and the second green subpixel Gp2 in the even-numbered pixel row E_ROW receive the data signals transferred from the first and second data lines DL1 and DL2. However, red and green subpixels connected to the odd-numbered gate line, for example, the first red subpixel Rp1 and the first green subpixel Gp1 in the odd-numbered pixel row O_ROW do not receive the data signals.

As described above, the red and green subpixels connected to the odd-numbered gate line receive data signals during the first period T1 of the first sub frame SF1 and the red and green subpixels connected to the even-numbered gate line receive data signals during the second period T2 of the first sub frame SF1.

In contrast, referring to FIGS. 2 and 8B, during the first period T1, when the gate signal is applied to the odd-numbered gate line, in other words, the first gate line GL1, the first transparent subpixel Tp1 in the odd-numbered pixel row O_ROW receives the data signal transferred from the third data line DL3, and the second transparent subpixel Tp2 in the even-numbered pixel row E_ROW receives the data signal transferred from the fourth data line DL4. During the first period T1, the first and second transparent subpixels Tp1 and Tp2 in the odd-numbered and even-numbered pixel rows OE_ROW respectively receive the data signal transferred from the third and fourth data lines DL3 and DL4.

Then, during the second period T2, when the gate signal is applied to the even-numbered gate line, in other words, the second gate line GL2, the second transparent subpixel Tp2 in the even-numbered pixel row E_ROW receives the data signal transferred from the third data line DL3, and the first transparent subpixel Tp1 in the odd-numbered pixel row O_ROW receives the data signal transferred from the fourth data line DL4. During the second period T2, the first and second transparent subpixels Tp1 and Tp2 in the odd-numbered and even-numbered pixel rows OE_ROW respectively receive the data signal transferred from the third and fourth data lines DL3 and DL4.

Therefore, the transparent subpixel Tp receives the data signal twice during the first period T1 and the second period T2 so that the data response time of the transparent subpixel Tp increases in comparison to a data response time of the red and green subpixels Rp and Gp.

Then, during the second sub frame SF2, the control part 100 provides the panel driving part 300 with second sub frame data set by the subpixel rendering method corresponding to the yellow light. The panel driving part 300 drives the display panel 200A using the second sub frame data. A method of driving the display panel 200A in the second sub frame SF2 is substantially the same as the method of driving the display panel 200A in the first sub frame SF1, and thus repetitive explanations are omitted.

As described above, according to the exemplary embodiments of the present invention, the transparent subpixel Tp is driven at twice the frequency than a frequency of the red and green subpixels Rp and Gp, so that the data response time of the transparent subpixel may be increased.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A display panel, comprising:
a first color subpixel connected to a first gate line;
a second color subpixel connected to the first gate line; and
a transparent subpixel connected to the first gate line with a first transistor and a second gate line adjacent to the first gate line with a second transistor,
wherein the first color subpixel comprises a third transistor connected to the first gate line and a first data line, and a first pixel electrode connected to the third transistor,
the second color subpixel comprises a fourth transistor connected to the first gate line and a second data line, and a second pixel electrode connected to the fourth transistor, and
the transparent subpixel comprises the first transistor connected to the first gate line and a third data line, the second transistor connected to the second gate line and a fourth data line, and a third pixel electrode connected to the first and second transistors.

2. The display panel of claim 1, wherein the first color subpixel is red and the second color subpixel is green.

3. The display panel of claim 1, wherein the first color subpixel is red and the second color subpixel is blue.

4. The display panel of claim 1, wherein the first color subpixel is green and the second color subpixel is blue.

5. A display apparatus, comprising:
a display panel comprising a first color subpixel having a first primary color, a second color subpixel having a second primary color and a transparent subpixel, the first and second color subpixels connected to a first gate line, the transparent subpixel connected to the first gate line with a first transistor and a second gate line with a second transistor;
a light-source part configured to alternately provide the display panel with a first color light having a third primary color and a second color light having a mixed color by mixing the first primary color and the second primary color during a frame which includes a first sub frame and a second sub frame; and
a panel driving part configured to alternately drive the first gate line and the second gate line,
wherein the first color subpixel comprises a third transistor connected to the first gate line and a first data line and a first pixel electrode connected to the third transistor,
the second color subpixel comprises a fourth transistor connected to the first gate line and a second data line, and a second pixel electrode connected to the fourth transistor, and
the transparent subpixel comprises the first transistor connected to the first gate line and a third data line, the second transistor connected to the second gate line and a fourth data line, and a third pixel electrode connected to the first and second transistors.

6. The display apparatus of claim 5, wherein the first primary color is red and the second primary color is green.

7. The display apparatus of claim 5, wherein the first primary color is red and the second primary color is blue.

8. The display apparatus of claim 5, wherein the first primary color is green and the second primary color is blue.

9. The display apparatus of claim 5, further comprising: a control part configured to set a first grayscale data level (A) of the first primary color, a second grayscale data level (B) of the second primary color and a third grayscale data level (C) of the third primary color based on the color light provided to the display panel.

10. The display apparatus of claim 9, wherein during the first sub frame in which the first color light is provided to the display panel, the control part sets a grayscale data level of the transparent subpixel to the third grayscale data level (C), during the second sub frame in which the second color light is provided to the display panel, the control part sets a grayscale data level of the first color subpixel to A-min(A,B), a grayscale data level of the second color subpixel to B-min(A,B), and the grayscale data level of the transparent subpixel to min(A,B).

11. The display apparatus of claim 9, wherein during the first sub frame in which the first color light is provided to the display panel, the control part sets a grayscale data level of the transparent subpixel to 2C, during the second sub frame in which the second color light is provided to the display panel, the control part sets a grayscale data level of the first color subpixel to A, a grayscale data level of the second color subpixel to B, and the grayscale data level of the transparent subpixel to A+B.

12. The display apparatus of claim 5, wherein the panel driving part drives the first gate line during a first period of each of the first and second sub frames and drives the second gate line during a second period of each of the first and second sub frames, a data signal applied to the transparent subpixel during the first period is the same as a data signal applied to the transparent subpixel during the second period.

13. The display apparatus of claim 5, wherein the panel driving part drives the first gate line during a first period of each of the first and second sub frames and drives the second gate line during a second period of each of the first and second sub frames, a data signal applied to the transparent subpixel during the first period is different from a data signal applied to the transparent subpixel during the second period.

14. The display apparatus of claim 13, wherein during the first and second periods, a black data signal is applied to the transparent subpixel to display a black image.

15. The display apparatus of claim 5, wherein the light-source part comprises a plurality of light-emitting blocks arranged along an image scan direction of the display panel, the light-emitting blocks sequentially emit light in the image scan direction during each of the first and second sub frames.

16. The display apparatus of claim 15, wherein the panel driving part individually drives a plurality of display blocks corresponding to the light-emitting blocks, the panel driving part drives odd-numbered gate lines of the display panel during a first period of a light-emitting period in which each of the light-emitting blocks emits light, and drives even-numbered gate lines of the display panel during a second period of the light-emitting period.

17. The display apparatus of claim 15, wherein the light-emitting blocks are sequentially driven during a first period of each of the first and second sub frames, and sequentially driven during a second period of each of the first and second sub frames.

18. The display apparatus of claim 17, wherein the panel driving part drives odd-numbered gate lines of the display panel during the first period and drives even-numbered gate lines of the display panel during the second period.

19. A display apparatus, comprising:
a display panel including a first color subpixel, a second color subpixel and a transparent subpixel arranged in a row;
a light source configured to provide light to the display panel; and
a control part configured to, in a first sub frame of a frame, cause the transparent subpixel to receive a first data signal during a first period of the first sub frame to display a blue image corresponding to blue light and the first data signal during a second period of the first sub frame to display the blue image and, in a second sub frame of the frame,
the control part is configured to cause the transparent subpixel to receive a second data signal during a first period of the second sub frame to display a white image corresponding to yellow light and the second data signal during a second period of the second sub frame to display the white image,
wherein the transparent subpixel is connected to a first gate line with a first transistor and a second gate line adjacent to the first gate line with a second transistor,
wherein the first color subpixel comprises a third transistor connected to the first gate line and a first data line, and a first pixel electrode connected to the third transistor,
the second color subpixel comprises a fourth transistor connected to the first gate line and a second data line, and a second pixel electrode connected to the fourth transistor, and the transparent subpixel comprises the first transistor connected to the first gate line and a third data line, the second transistor connected to the second gate line and a fourth data line, and a third pixel electrode connected to the first and second transistors.

* * * * *